No. 851,136. PATENTED APR. 23, 1907.
B. & F. LJUNGSTRÖM.
OPERATING DEVICE FOR MILKING MACHINES.
APPLICATION FILED JAN. 24, 1907.
2 SHEETS—SHEET 1.
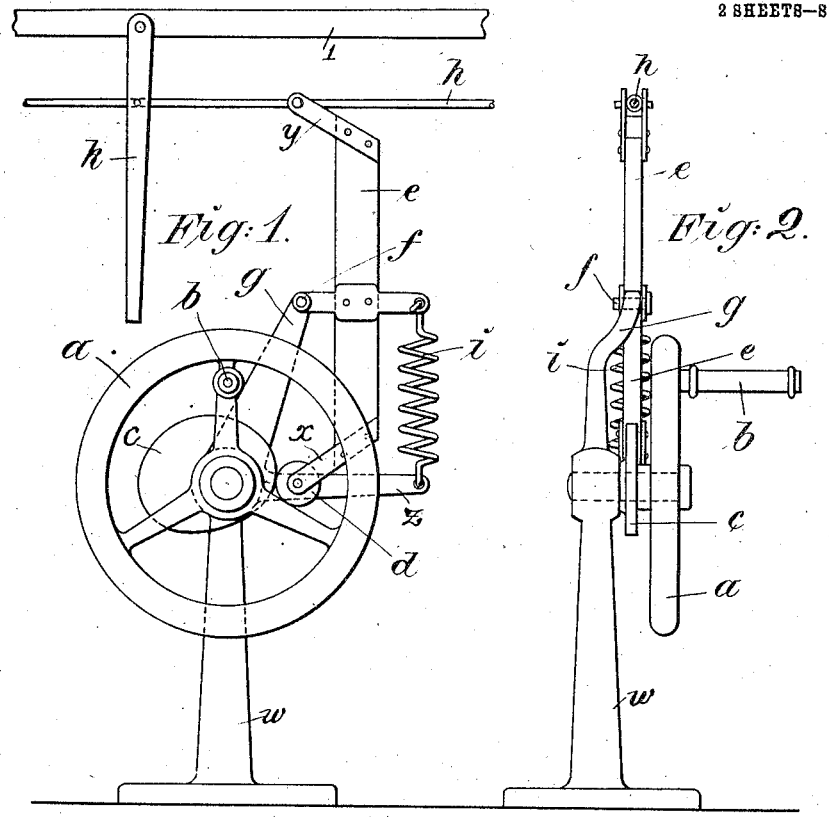
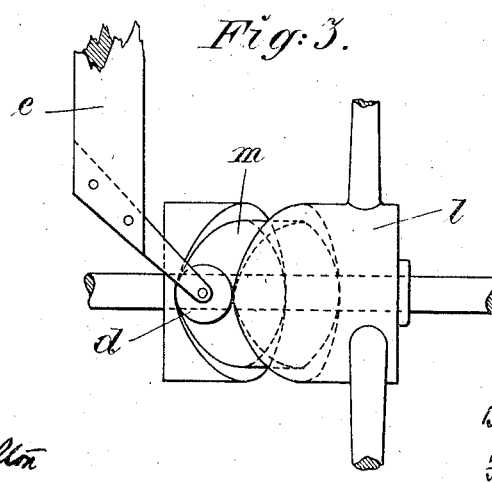
WITNESSES:
M. M. Hamilton
E. E. Wall
INVENTORS
Birger Ljungström
Fredrik Ljungström
BY
Standing & Standing
ATTORNEYS.

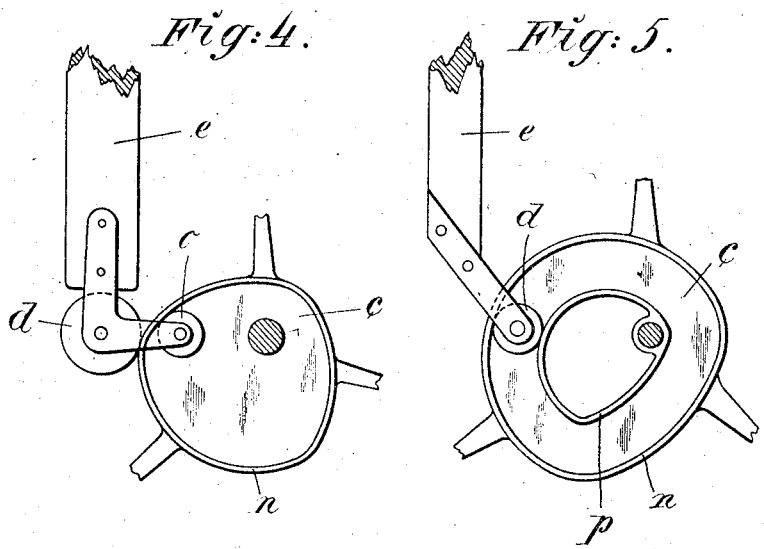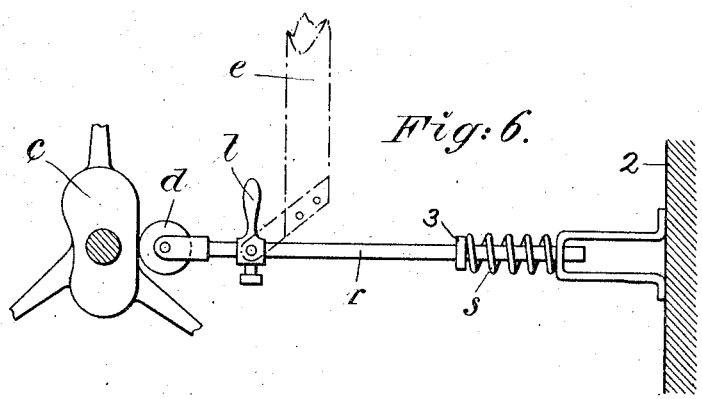

UNITED STATES PATENT OFFICE.

BIRGER LJUNGSTRÖM AND FREDRIK LJUNGSTRÖM, OF STOCKHOLM, SWEDEN, ASSIGNORS TO AKTIEBOLAGET SEPARATOR, OF STOCKHOLM, SWEDEN.

OPERATING DEVICE FOR MILKING-MACHINES.

No. 851,136.      Specification of Letters Patent.      Patented April 23, 1907.

Application filed January 24, 1907. Serial No. 353,931.

*To all whom it may concern:*

Be it known that we, BIRGER LJUNGSTRÖM and FREDRIK LJUNGSTRÖM, subjects of the King of Sweden, and residing at Fleminggaten 8, Stockholm, Sweden, have invented certain new and useful Improvements in Operating Devices for Milking-Machines; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to an improvement for operating milking machines of such art, that are driven from rods or wires, having a reciprocating motion and the invention has for its object a device by means of which the said rods or wires are given a reciprocating motion. It is of the utmost importance, especially when a liquid is used for the operation of the milking organs of the machine, and when the motion is imparted to said liquid from a pump connected with the wire or rod, that the acceleration and retardation of the liquid be a certain one, as in other cases loss of energy will occur on account of the shocks of the liquid.

The present invention has for its object a device for operating the rod or wire in such a way that the motion of said wire or rod, *i. e.* its acceleration and retardation at a certain moment is in technical respect the accurate one, in order that the milking machines may be driven with the smallest possible expense of energy.

According to the present invention the desired motion of the rod or wire is created by means of a cam which is rotated by hand or motor and which operates a contacting arm or roller or such like device, which is connected with the rod or wire in any suitable way, for instance by means of a lever.

The invention is shown on the annexed drawings in several embodiments.

Figures 1 and 2 in front and side elevation, respectively one constructional form in two different elevations. Figs. 3, 4, 5 and 6 are detail views of different constructional forms of my invention.

In the Figs. 1 and 2, $a$ is a wheel which, by the aid of the crank $b$ can be rotated. Any power driving mechanism may be substituted for the crank. A cam $c$ is secured to the wheel $a$ or its shaft and against said cam $c$ a roller $d$ abuts. The roller $d$ is journaled in the projection $x$ from the end of the lever $e$ which lever turns on a pivot $f$ on the arm $g$, secured to the base $w$. The other end of the lever $e$ is connected with the wire $h$ by projection $y$. This wire is connected with the milking machines, not shown, and operates them. In order that the roller $d$ may be held in contact with the cam $c$, a spring $i$ is arranged between the lever $e$ and arm $z$ secured to the frame of the machine. The spring may evidently be replaced by its equivalent, for instance a weight.

In installations consisting of a few machines only, it may be desired that the same person, who operates the wire, may also take care of the machines. In order to make this possible, levers $k$ are arranged at different points on the wire $h$ and pivoted to the bar 1. By means of said levers the wire may be operated so as to obtain a reciprocating motion. The cam $c$ will then instead of operating the roller $d$, lever $e$ and wire $h$ be operated by the roller $d$ on account of the friction produced by the spring $i$, said cam will then only have a regulating influence upon the motion of the wire, so that its acceleration and retardation will be the desired one. The face of the cam $c$ is formed so as to produce the desired retardations and accelerations in the reciprocation of the wire $h$.

In Fig. 3 the cam is formed by a cylindrical body $l$ having a cam groove $m$ on its surface, wherein the roller $d$ is located.

In Fig. 4 the cam $c$ is provided with a flange $n$ on opposite sides of which are respectively the rollers $d$ and $o$, and in Fig. 5 the cam is provided with two flanges $n$ and $p$, between which the roller $d$ travels.

Fig. 6 shows a modification of the construction shown in Fig. 1 for pressing the roller $d$ against the cam $c$. The roller $d$ is rotatable on a pivot, secured to the end of a rod $r$ socketed in the frame 2. A spiral spring $s$ secured between frame 2 and a collar 3 fixed to rod $r$ holds the roller $d$ in contact with cam $c$.

*t* is a handle, by which, if the cam *c* be not operated by the crank as in Fig. 1, the rod *r* can be operated in its length direction, whereby the cam *c* determines the rythm of the motion of the rod *r*, i. e. the cam *c* can by this handle be put in motion in the same way as by means of the handle *k* in Fig. 1.

Having now fully described my invention, what I claim and desire to protect by Letters Patent is:

1. In operating devices for milking machines, in combination, a rod or wire adapted to have a reciprocating motion, an arm to which said wire is connected, a rotatable cam having the desired cam face against which said arm rests.

2. In operating devices for milking machines, in combination, a rod or wire adapted to have a reciprocating motion, an arm to which said wire is connected, a roller connected to said arm, a rotatable cam having the desired cam face against which said roller rests.

3. In operating devices for milking machines, in combination, a rod or wire adapted to have a reciprocating motion, a lever connected to said wire, an arm connected to said lever, a rotatable cam against which said arm rests.

4. In operating devices for milking machines, in combination, a rod or wire adapted to have a reciprocating motion, an arm to which said wire is connected, a rotatable cam having the desired cam face against which said arm rests, and means tending to hold said arm in contact with said cam face.

5. In operating devices for milking machines, in combination, a rod or wire adapted to have a reciprocating motion, an arm to which said wire is connected, a roller connected to said arm, a rotatable cam having the desired cam face against which said roller rests, and means tending to hold said arm in contact with said cam face.

6. In operating devices for milking machines, in combination, a rod or wire adapted to have a reciprocating motion, a lever connected to said wire, an arm connected to said lever, a rotatable cam against which said arm rests, and means tending to hold said arm in contact with said cam face.

7. In operating devices for milking machines, in combination, a rod or wire adapted to have a reciprocating motion, an arm to which said wire is connected, a rotatable cam having the desired cam face against which said arm rests, and handles connected to said wire whereby the cam may be driven by the movement of the wire.

8. In operating devices for milking machines, in combination, a rod or wire adapted to have a reciprocating motion, an arm to which said wire is connected, a roller connected to said arm, a rotatable cam having the desired cam face against which said roller rests, and handles connected to said wire whereby the cam may be driven by the movement of the wire.

9. In operating devices for milking machines, in combination, a rod or wire adapted to have a reciprocating motion, a lever connected to said wire, an arm connected to said lever, a rotatable cam against which said arm rests, and handles connected to said wire whereby the cam may be driven by the movement of the wire.

10. In operating devices for milking machines, in combination, a rod or wire adapted to have a reciprocating motion, an arm to which said wire is connected, a rotatable cam having the desired cam face against which said arm rests, means tending to hold said arm in contact with said cam face, and handles connected to said wire whereby the cam may be driven by the movement of the wire.

11. In operating devices for milking machines, in combination, a rod or wire adapted to have a reciprocating motion, an arm to which said wire is connected, a roller connected to said arm, a rotatable cam having the desired cam face against which said roller rests, means tending to hold said arm in contact with said cam face, and handles connected to said wire whereby the cam may be driven by the movement of the wire.

12. In operating devices for milking machines, in combination, a rod or wire adapted to have a reciprocating motion, a lever connected to said wire, an arm connected to said lever, a rotatable cam against which said arm rests, means tending to hold said arm in contact with said cam face, and handles connected to said wire whereby the cam may be driven by the movement of the wire.

In testimony of which invention, we have hereunto set our hands, at Stockholm, on this 9th day of January, 1907.

BIRGER LJUNGSTRÖM.
FREDRIK LJUNGSTRÖM.

Witnesses:
HJALMAR ZETTERSTRÖM.
HARRY ALBIBEE.